US006558541B1

(12) United States Patent
Morrison

(10) Patent No.: US 6,558,541 B1
(45) Date of Patent: May 6, 2003

(54) CONTAMINANT CAPTURE DEVICE AND METHOD FOR USE

(75) Inventor: George E. Morrison, Columbus, OH (US)

(73) Assignee: AV Lubricants, Inc., Groveport, OH (US)

( * ) Notice: Subject to any disclaimer, the term of this patent is extended or adjusted under 35 U.S.C. 154(b) by 0 days.

(21) Appl. No.: 09/689,959

(22) Filed: Oct. 12, 2000

(51) Int. Cl.$^7$ .............................. B03C 1/14; B01D 35/06
(52) U.S. Cl. ...................................... 210/222; 184/6.25
(58) Field of Search ........................... 184/6.25; 210/222

(56) References Cited

U.S. PATENT DOCUMENTS

| | | | |
|---|---|---|---|
| 3,800,914 A | * | 4/1974 | Miyata ........................ 184/6.25 |
| 4,216,092 A | * | 8/1980 | Shalhoob et al. ............ 210/222 |
| 4,851,116 A | | 7/1989 | Tomita |
| 4,995,971 A | | 2/1991 | Droste et al. |
| 5,196,112 A | | 3/1993 | Eichman |
| 5,383,534 A | | 1/1995 | Pollier |
| 5,949,317 A | | 9/1999 | Fink et al. |
| 6,111,492 A | | 8/2000 | Fink |
| 6,143,171 A | * | 11/2000 | Van Aarsen ................. 210/222 |

* cited by examiner

Primary Examiner—David A. Reifsnyder
(74) Attorney, Agent, or Firm—Sean M. Casey

(57) ABSTRACT

A contaminant capture device that is adapted to be immersed in a circulating fluid contained in an enclosed reservoir space, where the enclosed reservoir includes a wall formed with an opening. The capture device includes an installation cap configured for removable installation into the opening in the reservoir enclosure. A non-magnetic, generally cylindrical capture element is included, which is joined to the installation cap and configured to have a substantially smooth finish about the exterior surface. The capture element is also formed with an interior recess. The capture device further includes a plurality of cylindrical permanent magnets formed with generally planar opposite ends, which are arranged in a stacked configuration, separated from each other by pole interfaces. Once stacked, the magnets are received within the interior recess of the capture element. In one variation of the invention, each magnet is arranged in the stack with the respective north poles confronting each other. In this configuration, the resulting flux lines emanating from each pole are deflected outward to greater distances from the pole interfaces and with increased flux density than otherwise possible, which increases the attraction and capture of contaminants from the circulating fluid. The capture device can be periodically removed for cleaning.

25 Claims, 4 Drawing Sheets

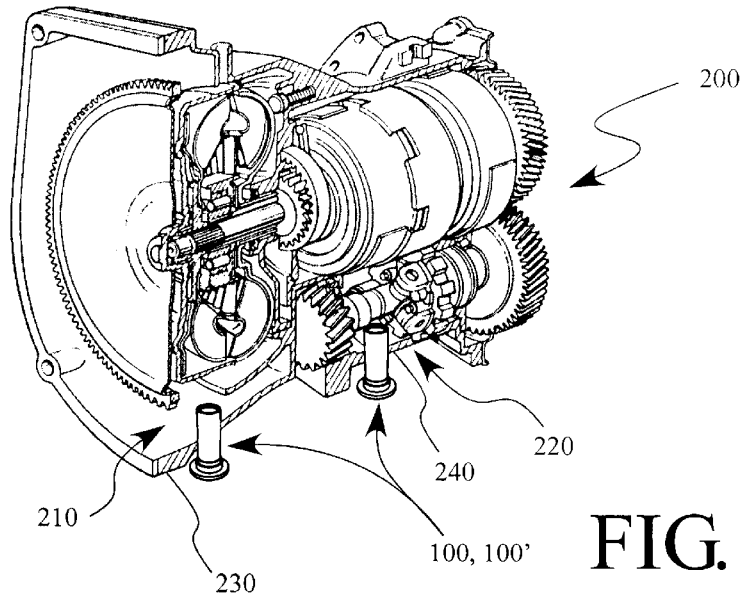
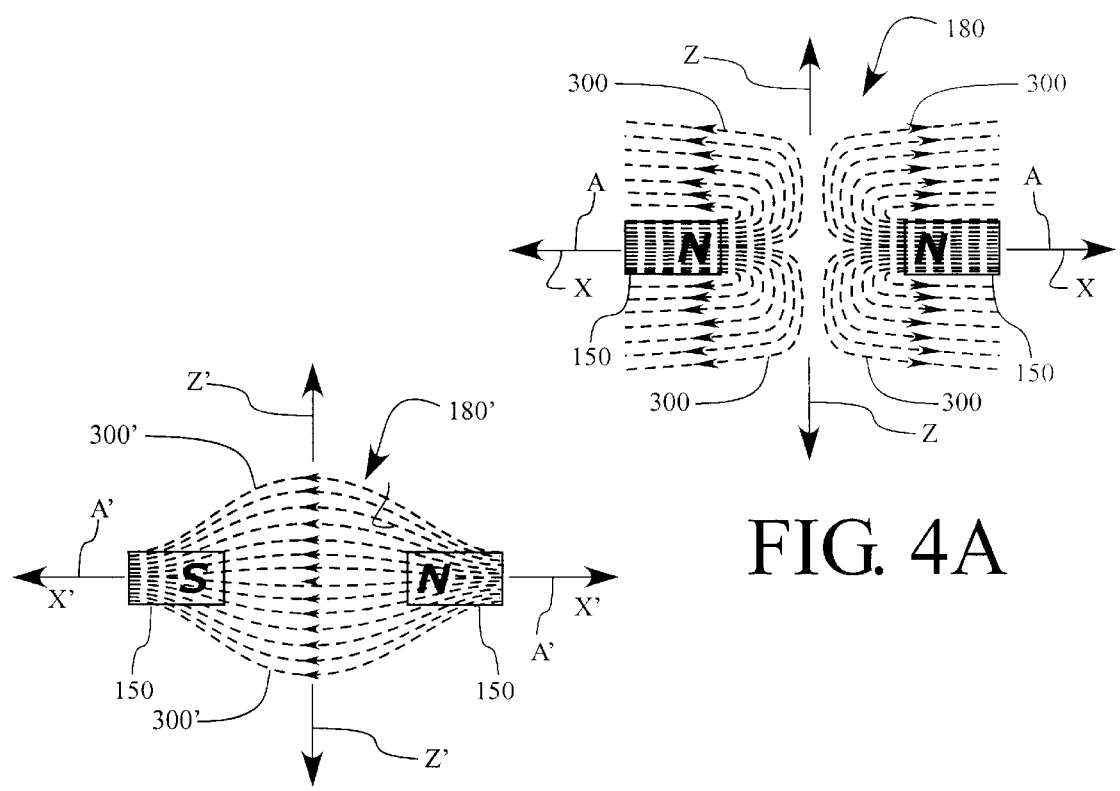
FIG. 3
FIG. 4A
FIG. 4B

CONTAMINANT CAPTURE DEVICE AND METHOD FOR USE

TECHNICAL FIELD

This invention relates to a magnetic contaminant capture device and a method for use in applications requiring the capture and removal of contaminants from a moving fluid that can be in either a gas, vapor, mist, or liquid state. The invention is directed to various embodiments that include applications in recirculating fluid systems and single-use fluid systems. The invention has application in recirculating lubrication systems that experience degradation in performance due to mechanical wear induced contaminants, and premature deterioration of lubricating fluid.

BACKGROUND OF THE INVENTION

In every industry, often continuously, various types of machines operate under heavy-duty loading conditions. All of these machines must be lubricated. Automotive engines, compressors, gearboxes and crankcases of all types, including transmissions and transaxles, are all subject to costly wear and damage. Proper lubrication and maintenance can minimize such problems. However, despite regular servicing of the lubrication systems, which includes changing myriad filters and fluids, considerable and sometimes catastrophic damage is experienced in such machines. That damage has often been deemed to be difficult, if not impossible to minimize. The primary cause of such damage has been well-defined and includes the wear resulting from metal surfaces moving against other metal surfaces, which creates metallic shavings, chips, and micron sized particles. The latter micron-sized, wear metal particles can operate as free metal catalysts that degrade lubricant effectiveness by oxidation of both desirable hydrocarbon chains and lubricity enhancing additives.

Lubrication of metal surfaces can substantially reduce wear and includes, among other methods, the application of surface coatings, interface materials, and petroleum-based oils and greases. In most machines, various types of oil and grease are used to lubricate the metal bearing surfaces that endure wear due both to metal on metal friction and to particulate abrasion. The former is generally controlled by periodic replacement of the lubricating fluid and, in some case, replacement or remachining of bearing surfaces. The latter is also controlled by regular changes of the lubricating fluid, but also primarily by filtration of circulating lubricants during operation.

However, another significant and harmful source of damage, which has been identified in recent years, results from the abrasive and catalyst effects of micron-sized particles and dust. In the past, these small particles have been known contaminants, but were deemed to be insignificant sources of wear; it was also not known that they attack the lubricity properties of the lubricants. Such contaminants are created under normal operation as wear and abrasion by-products of machine operation.

Various means have been employed to detect wear and damage to engines and machinery so that repairs and maintenance could be undertaken before catastrophic failure. One such means includes visual inspection of lubricant filters to detect debris and damaged components. Many types of equipment are also monitored using spectrographic analysis of the lubricant for purposes of detecting elemental components of frictional and abrasional wear by-products that are undetectable by visual observation. Other means of predictive wear analysis includes use of microscopes to count contaminant particles of various sizes, which can be indicative and predictive of failures of certain engine, machine, compressor, and gear box components. However, none of these sampling methods is all-inclusive, and the latter is ordinarily uneconomical and in some geographic regions, it is completely unavailable. Spectrographic analysis cannot identify potentially catastrophic failure due to chipped or otherwise damaged components, such as broken gear teeth, but it is useful for predicting wear patterns and in identifying drastic changes in the wear characteristics of equipment from one inspection to the next. A visual inspection is useful in detecting large metal shavings and a broken gear tooth, but it cannot identify the significant changes in wear patterns that predict major bearing surface failures. What is needed is a device that will augment these existing preventative methods while also incorporating the capability to capture and remove large shavings and broken pieces, as well as the smaller particles.

Those with skill in the art have known for some time that removal and replacement of lubricating fluid and real-time filtration is helpful to extending the life span of machine and engine components. It has only recently been discovered that even the best of removal and replacement operations and the best of filtration devices fail to remove highly damaging, micron-sized contaminants from the reservoirs, the fluid pathways, and the metal surfaces present inside such machines, engines, compressors, gear boxes and the like. Even if extremely thorough cleanings are accomplished during the removal and replacement of lubrication fluids, new particulate matter forms almost immediately upon renewed operation.

Most engines, gearboxes, and machinery do not incorporate filters capable of removing particles as small as 1, 2, and 5 to 10 microns from the lubrication fluid. This is primarily because such filters become clogged rapidly in pressurized, circulating lubricant systems, which can altogether prevent proper lubrication. In many types of gearboxes, such as, for example, various types of transaxles, a pressurized, circulating lubricant system is not practical from either an economic or operating workspace perspective. As a result, in such systems, even though lubricant is circulated during operation, there is no means to remove newly created debris and contaminants, except for isochronol removal and replacement of the lubricant. Here again, moments after a lubricant change, new debris and contaminants form upon renewed operation.

What has been missing from the art is a device that can work in conjunction with existing circulating lubricant systems and various types of machines and engines, which can augment existing filtration systems, and which can operate in the absence of any filtration system. Some attempts have been made in the past to create such a system. Fink et al. in U.S. Pat. Nos. 5,949,317 and 6,111,492 describes one such device. Fink et al. incorporates a magnet joined to an ordinary drain plug that is installed at the bottom of an engine crankcase oil pan. While Fink et al. maintains that claimed device attracts and captures magnetic particles from the circulating oil as it passes by the magnet, there are several shortcomings that prevent the concept from being effective in operation. First, when used in engines, which operate at high temperatures, the exposed magnet is susceptible to corrosion and deterioration of magnet strength, especially in engines operating at high diesel fuel temperatures. Even if coated as Fink et al. suggests, contact with abrasives and wear metals in the oil bath will destroy the coating and subject the magnet to oxidation and corrosion.

If the corrosion resistant materials suggested by Fink et al. are used, only relatively low field strengths are available, which cannot capture a significant amount of debris and contaminants. If higher field strengths are desired, then rare earth permanent magnet materials must be used, which are highly susceptible to corrosion and damage in normal engine operating environments. Moreover, the rare earth magnets are also far more fragile and susceptible to fracture and damage under the high stress, high shock environments experienced in most engines, heavy-duty machinery, and gearboxes. Such magnet would not function in Fink et al.'s intended configuration.

Other attempts have been to monitor debris collection in a circulating oil system, such as that disclosed in U.S. Pat. No. 5,196,112, and to magnetically remove ferrous materials, such as the devices disclosed in U.S. Pat. Nos. 5,383,534 and 4,995,971. Each of these devices are capable of attracting and capturing, to some extent, magnetic contaminants from the lubrication fluid, but are limited to engines that have pressurized lubricant systems which move the oil past the magnet. However, none of these devices are compatible for use in machinery that lacks pressurized oil systems because higher strength magnets are needed, which can attract and capture contaminants from farther away in the lubricant reservoir than is possible in these previous systems. Here again, without higher strength magnetic materials and improved configurations of magnets, neither Fink, nor any of the other references are capable of effectively capturing and retaining an appreciable amount of contaminants from the oil.

Each of such attempts falls short of offering any motivation, suggestion, or description of a device that incorporates very high field strengths, effective flux patterns and densities, and corrosion resistance. Neither are such devices compatible for use in a wide variety of machinery, ranging from hotter running diesel engines, as well as highly-loaded gear boxes that lack pressurized lubricant filtration systems. While the previously known systems have been able to capture some of the magnetic contaminants from the lubrication fluid, they are not nearly as effective as the present invention in removing significant quantities of the smaller, micron-sized particles, and in permanently retaining already captured debris and contaminants. Moreover, experience with such devices has demonstrated many shortcomings in the prior art devices. Use of the instant invention has demonstrated, in stark contrast, surprising improvements in lubricant life span and wear characteristics of a variety of machines. In the absence of the device of the instant invention, it has been found that previously captured contaminants are often reintroduced into the lubrication system because of ineffective field strengths and flux line configurations. This shortcoming is especially pronounced in machines having pressurized lubrication systems and lubrication systems under high shock and duty load environments, which move the lubricant rapidly past the old magnetic devices. Without the new and novel device of the present invention, the captured contaminants and debris can separate and rejoin the lubricant pool.

What has been needed but heretofore unavailable is a device that significantly improves not only the capture and retention of contaminants and debris contained in the lubricant, but a device that maximizes the life-span of the lubricant and that minimizes the wear of not only engines, but also various types of machines and gear boxes. In addition to offering major operational advantages over the prior art, such a device must also be inexpensive to acquire, simple to operate, compatible for use in a wide range of environments, and easily manufactured so as to make the device available to the widest possible base of machine and engine operators.

The present invention meets these and other needs without adding any complexity, inefficiencies, or significant costs to operation of the most commonly used engines, machines, and gear boxes. The various embodiments of the present invention disclosed herein are readily adapted for ease of manufacture, low fabrication costs, and immediate compatibility with such equipment that is presently employed in the field.

SUMMARY OF THE INVENTION

In general, the present invention is directed to a magnetic contaminant capture device and method for use in applications requiring the capture and removal of contaminants from a moving fluid, which can be in a variety of thermodynamic states. The invention is directed to various embodiments that include applications in recirculating and single-use fluid systems. A contaminant capture device is contemplated that is adapted for immersion in a circulating fluid that is contained in an enclosed reservoir space. The fluid is not necessarily arranged to flow in a re-circulating fluid path, but can be moving randomly about in the reservoir space during operation of an engine, machine, compressor, or gear box. The reservoir includes a wall that is formed with an opening, typically a fill, observation, sample, or drain port.

The device further includes an installation cap configured to be removably installed into the opening in the reservoir enclosure. Typically, a non-magnetic, generally cylindrical capture element is joined to the installation cap and configured to have a substantially smooth finish on the exterior surface. The capture element also includes an interior longitudinal recess than can also be generally cylindrical.

A plurality of cylindrical permanent magnets with generally planar ends is received within the recess in a stacked arrangement. Each magnet includes opposite north and south seeking poles at the flat ends and is separated from another in the stack by at least one non-magnetic spacer. The spacer occupies the interface between the ends of the magnets, which is termed the pole interface. In this embodiment, the magnets are arranged so the respective north poles confront each other at the pole interfaces. In this configuration, the confronting poles creates flux lines that are deflected from their normal orientation and outward from the pole interfaces at an increased distance and in a direction generally orthogonal to the longitudinal axis of the magnet stack. The deflected flux lines also have an increased flux density relative to the flux density at regions distal to the pole interface and between the poles of a single magnet of the plurality.

The increased distal reach of the higher-density flux lines, in turn, increases the quantities of magnetic contaminants in the circulating fluid that would otherwise be attracted to and captured on the exterior surface proximate to the pole interfaces. This increase attraction and capture capability has been shown to be greater than the contaminant quantities captured on the surface of the capture element in the region between the pole interfaces. Also, this arrangement has proven far superior to that demonstrated by the prior art single element magnet.

The present invention further contemplates a variation wherein the contaminant capture device incorporates magnets that are formed from a permanent magnet material having a Curie temperature of approximately at least 310 degrees centigrade, a maximum flux of at least 10,000 Gauss, and a coercive force of at least 9,000 oersteds. Alternatively, an electromagnet arrangement can be used wherein the magnets in the stack are augmented with or replaced with a ferrous material that is wound with an appropriate number of turns of suitable wire whereby the desired maximum flux is achieved. The permanent magnets may also be simply augmented with windings of an electromagnetic coil that can be energized to boost the overall field strength and flux density of the arrangement. In another variation of the preceding embodiments, the capture device incorporates permanent magnets that are formed from a neodymium, iron, boron alloy that has an operating temperature of approximately at least 150 degrees centigrade. Alternatively, the magnets are formed from a samarium cobalt alloy having an operating temperature of approximately at least 300 degrees centigrade. Various physical configurations are also contemplated wherein the plurality of magnets includes at least 3 magnets each having a diameter of approximately 0.75 inches or more, and a height of approximately 1 inch, or more. Additionally, the contaminant capture device is configurable wherein the plurality of the stacked magnets and the capture element are formed to protrude, from a proximate end joined to the installation cap, approximately at least 3 inches or more to an opposite distal end.

The present invention is also directed to a variation of the preceding embodiments wherein the contaminant capture device incorporates a non-magnetic, generally cylindrical capture element that is joined to the installation cap at a proximate end. The exterior surface of the capture element includes a substantially smooth finish and has a longitudinally extending interior recess. Here again, a plurality of cylindrical permanent magnets is stacked together and separated by non-magnetic spacers at pole interfaces and received within the interior recess. Each magnet has opposite north and south poles at generally planar ends. The magnets are arranged so that the north poles confront each other at the pole interfaces, whereby the resulting flux lines deflect outward from the pole interfaces with increased flux density relative to the flux density at regions distal to the pole interface, and at regions between the poles of each magnet. In this embodiment, each magnet of the plurality is selected to have different field strengths and the magnets are stacked in order of increasing field strength from the proximate end to a distal end of the capture element.

In another variation of the preceding embodiments, a contaminant capture device includes the previously described elements and at least three cylindrical permanent magnets that are stacked together, separated by non-magnetic spacers at the pole interfaces, and received within the interior recess of the capture element. In this configuration, the confronting north poles create far reaching flux lines extending from at least two pole interfaces, each with increased flux density relative to the flux density at other regions. The added number of interfaces creates additional regions that can attract and capture the previously described increased quantities of magnetic contaminants from the circulating fluid.

In a different configuration, a contaminant capture device is contemplated that incorporates a non-magnetic, generally cylindrical capture element joined at a proximate end to an installation cap and configured with a distal end, a substantially smooth finish on the exterior surface, and a longitudinally extending interior recess between the ends. Also included, is a plurality of cylindrical permanent magnets that are stacked together and separated by at least one non-magnetic spacer at at least one pole interface. The stacked magnets are received within the interior recess. Each magnet is formed with opposite north and south poles at generally planar ends. The magnets are arranged with the respective north and south poles confronting each other at the pole interfaces. Here, the density of the flux lines emanating from the distal end is greater than the density of those flux lines spanning the distal and proximate ends. In this variation of earlier embodiments, the magnets of the plurality are each selected to have different field strengths and are arranged in order of increasing field strength from the proximate end to the distal end. As a result, the quantities of magnetic contaminants in the circulating fluid that are attracted to and captured on the exterior surface proximate to the distal end is greater than the contaminant quantities captured on the surface of the capture element in the region between the distal and proximate ends.

In operation, the present invention contemplates a method of using the contaminant capture device of the instant invention. The method is directed to using a capture device for removing contaminants from a circulating fluid that is contained in a machine that has an enclosed reservoir space that includes a wall formed with an opening. In the first step of the method, a capture device is selected that is adapted to be immersed in the fluid. The selected device incorporates an installation cap configured to be removably installed into the opening in the reservoir enclosure. Also included, is a non-magnetic, generally cylindrical capture element that is joined to the installation cap and configured with a substantially smooth finish on the exterior surface and with a longitudinally extending interior recess. Received in the recess are a plurality of cylindrical permanent magnets that are stacked together and separated by at least one non-magnetic spacer at at least one pole interface. Each magnet has respective opposite north and south poles at generally planar ends. The magnets are arranged so that the north poles confront each other at the pole interfaces, so that the resulting flux lines are deflected from their otherwise normal positions and generally outward from the pole interfaces in a direction orthogonal to the longitudinal direction of the recess and the stack. The rearranged flux lines also experience an increased flux density relative to the flux density at regions distal to the pole interface and between the respective poles of each magnet. In this configuration, the quantities of magnetic contaminants in the circulating fluid that are attracted to and captured on the exterior surface proximate to the pole interfaces is greater than the contaminant quantities captured on the surface of the capture element in the regions between the pole interfaces.

In the next step, the capture device is installed into the opening of the reservoir to protrude into the reservoir space for a period of time that includes operation of the machine. During the period of operation, the circulating fluid passes proximate to the capture device whereby contaminants, including shavings and ferrous particles, are attracted to and captured by the capture element.

Lastly, the capture device is removed from the opening during a period of non-operation of the machine. The retained contaminants are removed from the capture element, and the capture device is cleaned before reinstallation.

BRIEF DESCRIPTION OF THE DRAWINGS

Without limiting the scope of the present invention as claimed below and referring now to the drawings and figures, wherein like reference numerals and numerals with primes and double-primes across the several figures and views refer to identical, corresponding, or equivalent features and parts:

FIG. 3 is an elevated perspective view, in reduced scale, of a typical automotive transaxle that includes enclosed fluid reservoir spaces, and which incorporates the contaminant capture device of either FIGS. 1 or 2, or both;

FIG. 4A is a partial detail view, in enlarged scale, of the pole interface of the device of FIG. 1;

FIG. 4B is a partial detail view, in enlarged scale, of the pole interface of the device of FIG. 2;

DESCRIPTION OF THE PREFERRED EMBODIMENTS

The contaminant capture device of the present invention significantly improves the efficiency with which contaminants are captured and removed from a lubrication fluid whether in an engine, machine, or gear box, including transmissions and transaxle assemblies that may not incorporate any means of pressurized lubricant circulation or filtration. The contaminant capture device accomplishes this by new and novel arrangements of high strength magnets that are arranged in unique configurations, which have demonstrated unexpected and surprising results.

Figure 1:
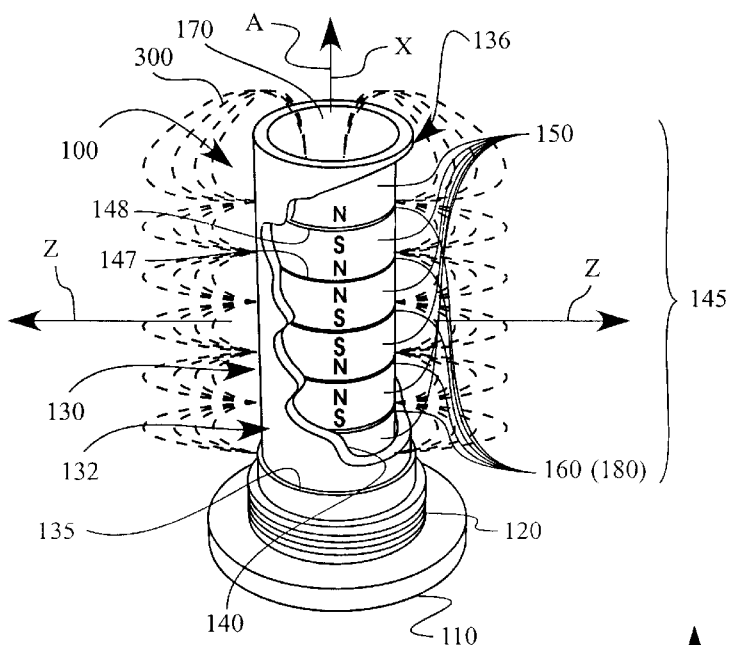
FIG. 1 is an elevated perspective view, in reduced scale, of a contaminant capture device according to the present invention.
Figure 2:
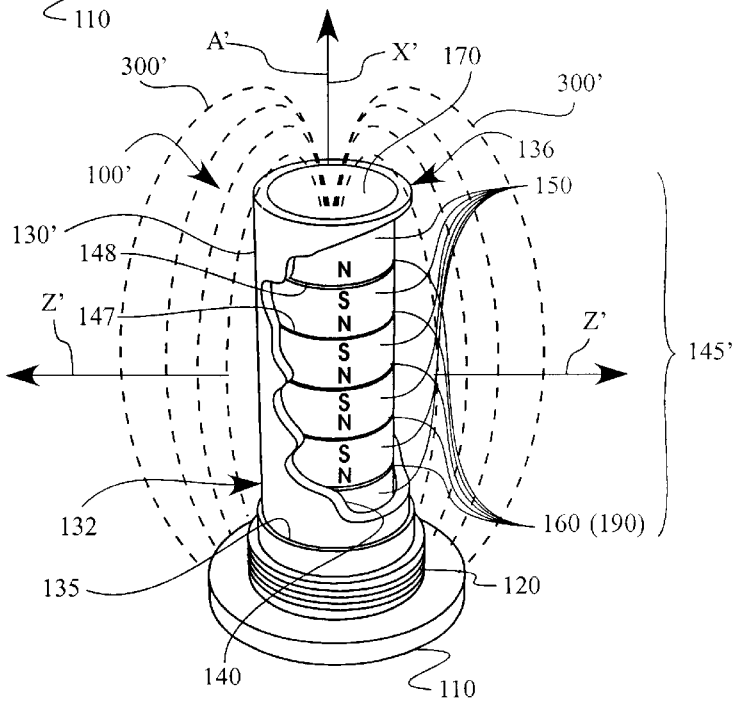
FIG. 2 is an elevated perspective view, in reduced scale, of a variation of the contaminant capture device of FIG. 1.

With reference to the various figures and drawings, and with particular reference to FIGS. 1, 2, and 3, a contaminant capture device 100, 100' is described that is adapted for immersion in a circulating fluid (not shown) that is contained in an enclosed reservoir space. Although such a reservoir space may be part of just about any type of engine, machine, compressor, or gear box, for purposes of illustration, but not limitation, a transaxle apparatus 200 is shown in FIG. 3, which includes reservoir spaces 210, 220. The device 200 shown is an automotive type of transaxle commonly used in front wheel drive automotive vehicles. Similar types of transaxles are also incorporated in many types of high-powered large trucks and earth moving equipment, and are representative of the type of machine that is subjected to high operating temperatures, severe shock loads, and heavy duty continuous loads. The reservoirs 210, 220 include a wall, such as walls 230, 240 that are formed with an opening, typically a fill, observation, sample, or drain port.

The device 100, 100' further includes an installation cap 110 that is configured to be removably installed into the opening in the reservoir enclosure 210, 220. Installation cap 110 is preferably formed from a high-strength non-magnetic steel, such as stainless steel, which is far easier to clean in operation since captured contaminants will not adhere thereto. The cap 110 may be formed with any number of bayonet and twist-lock type fittings, but is preferably formed with male threads 120 for receipt into threads formed in the reservoir opening. In certain applications where various types of galvanic corrosion or cold welding of the threaded joint may present an issue, stainless steel may be undesirable, and a material that is compatible for use with the reservoir wall material is needed.

Typically, a non-magnetic, generally cylindrical capture element 130, 130' is also included that includes a proximate end 132 and an opposite distal end 136. The proximate end 132 is joined to the installation cap 110 and configured to have a substantially smooth finish on the exterior surface. The capture element 130, 130' also includes an interior longitudinal recess 140 than can also be generally cylindrical. The recess 140 has an axis that corresponds to the centerlines identified by respective reference identifiers A, A'. The capture element 130, 130' can be a high-strength aluminum, but is preferably a non-magnetic, high-temperature steel. Element 130, 130' may be constructed from a single piece of non-magnetic material that also incorporates cap 110. Alternatively, element 130, 130' may be a separately machined or extruded piece that is formed to be threaded into a recess (not shown) in cap 110. In yet another variation, element 130, 130' may be sized for an interference, press fit into a recess (not shown) formed in the cap 110. Additionally, the capture element 130, 130' may be received into a recess (not shown) in cap 110 and a lip 135 at the upper edge of the cap recess (not shown) may be welded or knurled thereby permanently joining the capture element to the installation cap 110.

The capture element 130, 130' also may be formed with one or both ends 132, 136 open. In one alternative, the element 130, 130' is machined and include only a single open end. In the latter, after the magnets are received within the element recess, as described below, the open end is joined to the installation cap 110 thereby captivating the magnets. In another configuration, the capture element 130, 130' is joined to the installation cap 110 in any of the preceding ways, and then the magnets are received into the recess of element 130, 130' at the distal end 136. Next, an end cap 170 is installed and permanently joined to element 130, 130'.

The preceding embodiment, as best illustrated in FIG. 1, further includes a plurality of cylindrical permanent magnets 145, 145' with generally planar ends 147, 148. The plurality 145, 145' is received within the recess in a stacked arrangement. The magnets 150 are preferably received within the element 130, 130' and sealed to minimize if not eliminate the deleterious corrosion and oxidative effects prevalent in using rare earth magnets of the type preferred for purposes of the present invention, as described in more detail below. Each magnet 150 includes opposite north and south seeking poles (generally designated in the various figures by "N" and "S", respectively) at the flat ends 147, 148. The magnets 150 are separated from each other in the stack by at least one non-magnetic spacer 160. Although not required for purposes of the present invention, the spacers 160 may be formed from any suitable material including cardboard, paper, phenolic, plastic, or even a thin layer of adhesive epoxy. In certain magnet captive configurations, no spacers whatsoever are required. The combination of the magnets 150 contained in the non-magnetic capture element 130, 130' ensures that the reluctance effect on the magnet field strength is minimized and that the permeance is maximized. Additionally, it is analogously important to ensure that once the magnets 150 are installed and received into the recess of element 130, 130' that they do not contact the installation cap 110, which may be constructed of a ferrous material as described above. This can be accomplished by using a non-magnetic, non-ferrous spacer within the recess of capture element 130, 130' if needed. In addition to minimizing adverse effect on the field strength due to leakage into the installation cap 110, this arrangement also ensures that the magnetic field does not leak into and thereby emanate from the surrounding walls of the reservoir enclosures, such as those surrounding reservoir spaces 220, 240. If this not avoided, then the walls of the reservoir may attract and capture the magnetic debris sought to be removed by the contaminant capture device The spacers 160 serve the important function of protecting the preferably high-strength magnets from direct contact. This is important when using rare earth magnet materials that can be easily damaged if allowed to slam together during the assembly process. Such rare earth materials are typically press formed or sintered using powdered metallurgy techniques that typically result in brittle alloys, which can be easily destroyed if not handled carefully.

The spacers 160 occupy the interface between the ends of the magnets, which is termed the pole interface for purposes of simplified reference herein. With reference also now to FIG. 4A, the pole interface region 180, is more clearly shown. In the embodiment depicted in FIG. 1, the magnets 150 are arranged so that the respective north poles N confront each other at the pole interfaces 180. In this configuration, the confronting poles N-N create flux lines, identified generally by reference numeral 300, that are deflected from their normal orientation and outward from the pole interfaces 180 at an increased distance and in a direction generally orthogonal to the longitudinal axis A, as identified by the arrows designated Z, of the magnet stack 145. The deflected flux lines 300 also have an increased flux density and apparent field strength, which is depicted by flux lines 300 that are closer together, relative to the flux density at regions distal to the pole interface 180 and between the poles N, S of a single magnet 150 of the plurality 145, which is indicated by flux lines 300 that are farther apart.

Figure 7:
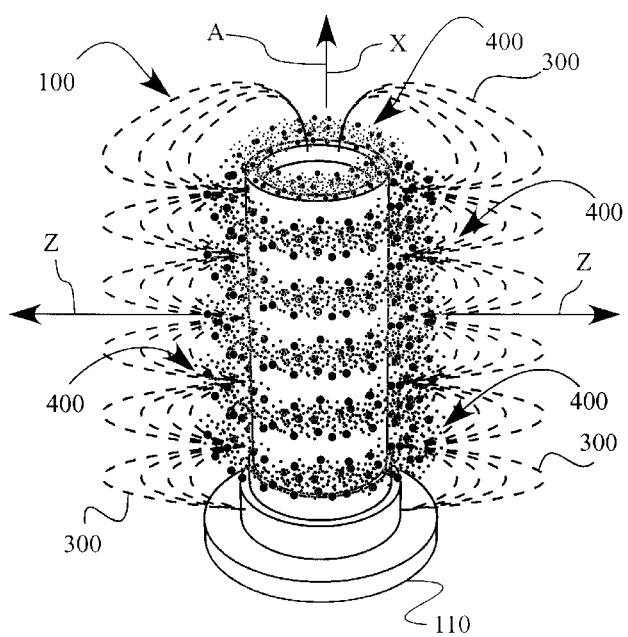
FIG. 7 is an elevated perspective view, in reduced scale, of the contaminant capture device of FIG. 1 in operation.

With continued reference to the previously described figures and now also to FIG. 7, it can be understood that the increased reach and effective field strength, denoted by the higher-density flux lines 300 best shown in FIG. 1, in turn, increases the quantities of magnetic contaminants 400 in the circulating fluid (not shown) that would otherwise be attracted to and captured on the exterior surface of the capture element 130 proximate to the pole interfaces 180. The increased attraction and capture capability of the contaminant capture device 100 has been demonstrated to be greater than the contaminant quantities captured on the surface of the capture element 100 in the region between the pole interfaces. Also, this arrangement has proven far superior to that demonstrated by a single element magnet having opposite north and south poles.

It is important to note that a secure means of captivating the magnets within the capture element 300, 300' is imperative, especially in the instant embodiment where high-strength, high coercive force magnet materials are used in the repelling pole N, N arrangement. The high-strength magnets can become projectiles if not carefully assembled and retained after assembly. Accordingly, it is preferred that a fast-curing epoxy adhesive is used to secure the magnets within the recess of capture element 300, 300' during assembly. Further, it is preferred that either the integrally machined, closed distal end 136 be employed, or that a securely welded end cap 170 be used to ensure that the magnets 150 are retained even if the epoxy bond fails.

Figure 5:
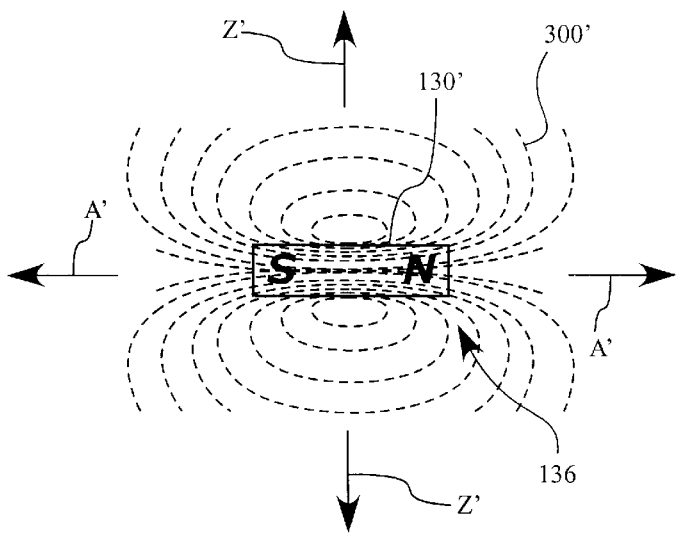
FIG. 5 is a partial detail view, in enlarged scale, of the overall flux line configuration of the device of FIG. 2.
Figure 8:
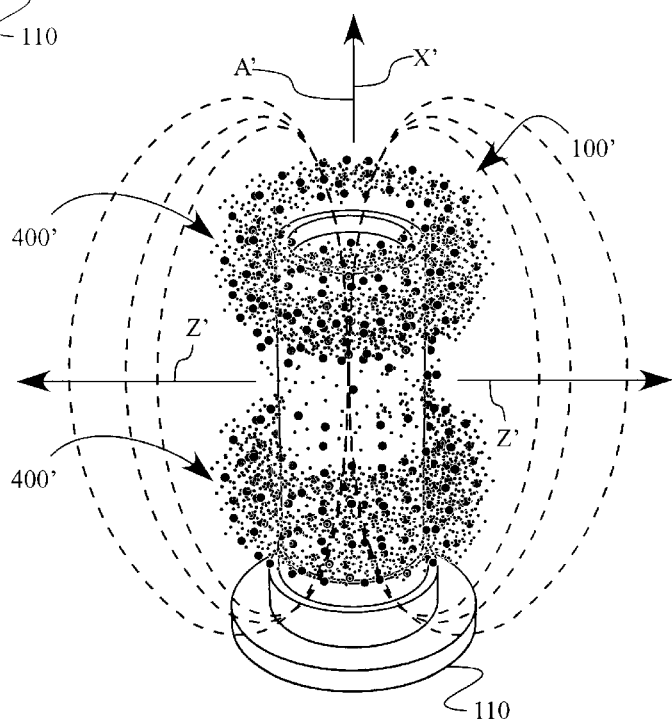
FIG. 8 is an elevated perspective view, in reduced scale, of the contaminant capture device of FIG. 2 in operation.

With continued reference to the previously discussed figures, and with particular reference next to FIG. 2, an alternative variation of the preceding embodiment is described. In this alternative, a contaminant capture device is 100' contemplated that incorporates a non-magnetic, generally cylindrical capture element 130' that is joined at a proximate end 132 to an installation cap 110 and configured with a distal end 136, a substantially smooth finish on the exterior surface, and a longitudinally extending interior recess between the ends 132, 136 that has an axis corresponding to the centerline denoted by reference identifier A'. Also included, is a plurality of cylindrical permanent magnets 150 that are stacked together and separated by at least one non-magnetic spacer 160 at at least one pole interface 180'. The interaction of the magnetic fields pole interface(s) 180' can be best appreciated with reference now to FIG. 4B. The stacked magnets 145' are received within the interior recess of element 130'. Each magnet 150 is formed with opposite north and south poles at generally planar ends 147, 148. The magnets 150 are arranged with the respective north and south poles confronting each other at the pole interfaces 180'. Here, the density of the flux lines 300' emanating from the distal end 136 are greater than those spanning the distal and proximate ends about the region passing through arrows denoted Z'. In this variation of earlier embodiments, the magnets 150 of the plurality 145 are each selected to have different field strengths and are arranged in order of increasing field strength from the proximate end 132 to the distal end 136. In this varied and unique arrangement, the configuration of the flux lines can be adjusted to accommodate and be more suitable to different fluid circulation patterns that may exist in various types of engines, machines, gear boxes, compressors, and the like. With reference also to FIGS. 5 and 8, it can be appreciated that as a result, the quantities of magnetic contaminants 400' in the circulating fluid (not shown) that are attracted to and captured on the exterior surface proximate to the distal end 136 is greater than the contaminant 400' quantities captured on the surface of the capture element 130' in the region between the distal 136 and proximate ends 132. Moreover, the arrangement of magnets 150 wherein they are arranged with respective strengths increasing from the proximate end 132 to the distal end 136 further ensures that a larger quantity of contaminants will be captured distal to the walls of the reservoir and the opening thereof. This can minimize the contaminants 400' that may deposit on the reservoir walls under the force of gravity in certain situations.

The present invention also contemplates a variation of the preceding embodiments, modifications, and variations wherein the contaminant capture device incorporates magnets 150 that are formed from a permanent magnet rare earth material. Preferably, the material is selected to have a Curie temperature of approximately at least 310 degrees centigrade and an operating temperature of approximately at least 120 degrees centigrade, a maximum flux of at least 10,000 Gauss, and a coercive force of at least 9,000 oersteds. Magnets having these properties are readily available from a number of suppliers including, for example, Magnet Sales & Manufacturing, Inc., of Culver City, Calif., U.S.A.

Figure 6:
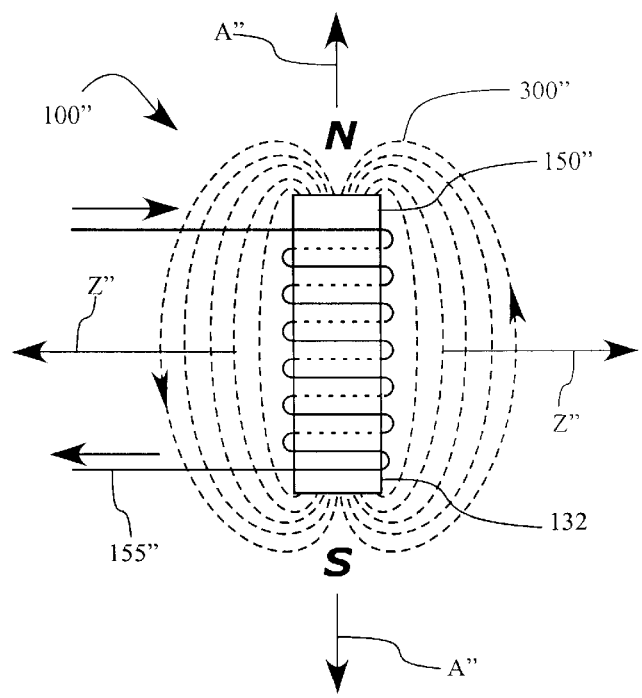
FIG. 6 is a partial, schematic view, in enlarged scale, of a variation of the embodiments depicted in FIGS. 1 and 2

Alternatively, as can be understood by those with skill in the art with reference to FIG. 6, an electromagnet arrangement can be used wherein the magnets 150" in the stack, such as stack 145 or 145', are augmented with or replaced with a ferrous material that is wound with an appropriate number of turns of suitable wire 155" whereby a desired reconfigurable maximum flux is achieved. As with preceding embodiments and variations, the magnets 150" may be arranged in a north-north or north-south pole interface configuration. The permanent magnets 150" may also be simply augmented with windings of an electromagnetic coil 155" that can be energized to boost the overall field strength and flux density of the arrangement.

In another variation of the preceding embodiments, the capture device 100, 100' incorporates permanent magnets 150, 150" that are formed from a neodymium, iron, boron alloy that has an operating temperature of approximately at least 150 degrees centigrade. Alternatively, the magnets are formed from a samarium cobalt alloy having an operating temperature of approximately at least 300 degrees centigrade. As before, Magnet Sales & Manufacturing is a viable supplier of such rare earth magnet materials.

Various physical configurations are also contemplated wherein the plurality of magnets 145, 145' includes at least 3 magnets, such as magnets 150 and 150", each having a diameter of approximately 0.75 inches and a height of approximately 1 inch. Additionally, the contaminant capture device 100, 100' is configurable wherein the plurality of the stacked magnets 145, 145' and the capture element 130, 130' are formed to protrude, from the proximate end 132 approximately at least 3 inches to the opposite distal end 136. As can be appreciated with specific reference to FIGS. 7 and 8, including additional magnets 150 that are arranged in the repelling pole configuration of FIG. 4A creates additional pole interfaces 180, which attract and capture increased quantities of contaminants 400. Any number of suitable and easily configurable diameters and lengths are obtainable using the stock and custom rare earth magnets that are readily available from Magnet Sales & Manufacturing, Inc., among many other U.S. and overseas vendors.

In operation, significant and unexpected improvements were noted using the device according to the present invention. A large, high-powered, earth moving vehicle, commonly referred to by those in the earth moving industry as a "Payhauler 350C" was used to test the present invention. Each of the 4 wheels of the vehicle includes a heavy duty "final-drive" transaxle that contains various planetary gear components, which components are all subjected to heavy and continuous loads as well as frequent shock loads. A contaminant capture device according to the present invention was installed on the left front ("LF") and right rear ("RR") transaxles of the vehicle. These transaxles and that of the right front wheel ("RF", no contaminant capture device was installed) were monitored over a 6-month interval at which time an oil sample was removed from each of the transaxle reservoirs for spectrographic quantitative analysis of the wear metals present in the oil and a visual qualitative analysis. A determination of the presence of certain wear metals (in units of parts of wear metals per million parts of oil) can give an indication that components are either wearing as expected, or, in the event of significant changes in the comparative test results, that one or more components are approaching a catastrophic failure. On Oct. 28, 1999, before installation of the contaminant capture device, samples were taken and results recorded. Samples were taken again after 6 months, in May, 2000, and again the results of the analyses were recorded.

| Transaxle | Inspection Date | WEAR METALS | | | | | | |
|---|---|---|---|---|---|---|---|---|
| | | Iron | Aluminum | Copper | Lead | Chromium | Tin | Nickel |
| RF | 10/28/99 | 339 | 13 | 29 | 4 | 2 | 1 | 3 |
| RF | 5/23/00 | 354 | 9 | 17 | 2 | 2 | 0 | 4 |
| LF | 10/28/99 | 453 | 15 | 50 | 6 | 1 | 4 | 1 |
| LF | 5/18/00 | 192 | 5 | 34 | 5 | 1 | 1 | 0 |
| RR | 10/28/99 | 379 | 3 | 320 | 42 | 1 | 30 | 2 |
| RR | 5/23/00 | 157 | 2 | 60 | 12 | 0 | 8 | 0 |

As expected, there was no significant change in the wear metal characteristics of the RF transaxle oil. The most significant results are seen with reference to the LF and RR transaxle unit, which each experienced a reduction in iron, which is magnetic. The reduction in nickel, tin, copper, lead, and aluminum is likely connected to the reduction in iron since they are used as a alloy hardeners in the process of making steel.

In another application, a heavily loaded planetary gear box that is used in a fairly simple power transfer shaft application was regularly maintained by way of oil changes after every 250 hours of service. A quality analysis of the removed oil before installation of the present invention indicated that the oil was blackened in color and had a burnt odor. These qualities are indicative to those with skill in the art of lubricity and tribology of a highly-oxidized and deteriorated oil that has been catalyzed in the presence of high temperatures and excessive contaminants, which include the various wear metal particles created during operation. After installation of the contaminant capture device constructed in accordance with the present invention, the oil was changed after another 250 hours of service had elapsed. However, quite unexpectedly, the oil appeared to be clear in color and identical to that of new, virgin oil. The expected burnt odor was instead replaced with the odor of fresh, virgin oil. Additionally, temperature logs of the gearbox noted a 5 degree centigrade reduction in the operating temperature. By inference, this result seems to be due to the reduced amount of free metal abrasives, which are the normal product of gear operation, and the reduced friction resulting from the improved and prolonged lubricity of the oil. Moreover, those with skill in the lubrication art will also appreciate that removing the free metal catalysts from the oil pool leaves the various oil additives intact. Additives include zinc and phosphorous, which serve to reduce the cold welding affect that occurs at the metal-on-metal interface where surface asperites contact and weld to each other.

Removing the wear by-product free metals also is particularly important since in recent months and years, various lubricant suppliers have eliminated various dispersant additives from the oil. In the past, dispersants were added to oil to improve its adherence to the metals components in lubricated machinery. However, the industry came to understand that the dispersants caused contaminants, dust, and debris to be suspended in the oil, and so dispersants have been removed from many types of oil. This effect was useful also because oil samples taken from the oil reservoir for spectrographic analysis would contain a representative quantity of the wear metals present in the oil. However, without dispersants, spectrographic analysis no longer works properly because wear metals fall immediately out of suspension once operation on the machine is stopped. Accordingly, the need for the contaminant capture device of the present invention is ever more apparent.

The results achieved in operations that incorporate the contaminant capture device described herein evidence a beneficiation of the lubrication and preventive maintenance process heretofore unseen. The resulting life-span and optimum lubricity properties of the lubricant, such commonly used motor and gear box oils, is greatly extended when catalytic oxidants such as iron, copper, and the like are minimized, if not removed altogether, from the operating environment.

The present invention establishes a significant advance over the previously known contaminant capture devices and methods for their use, and the advance is achieved with minimum cost, simplicity of fabrication, compatibility with a wide variety of existing engines, machines, and gear boxes, and with ease of use.

Numerous modifications and variations of the preferred embodiments disclosed herein will be apparent to those skilled in the art. For example, although specific embodiments have been described in detail, those with skill in the art will understand that the preceding embodiments and variations can be modified to incorporate various types of substitute and/or additional materials and dimensional configurations for compatibility with the wide variety of equipment available in the industry. Accordingly, even though only few variations of the present invention are described herein, it is to be understood that the practice of these additional modifications and variations and the equivalents thereof, are within the spirit and scope of the invention as defined in the following claims.

I claim:

1. A contaminant capture device adapted to be immersed in a circulating fluid that is contained in an enclosed reservoir space that includes a wall formed with an opening, comprising:

an installation cap configured to be removably installed into the opening in the reservoir enclosure;

a non-magnetic high-strength metallic, generally cylindrical capture element joined to the installation cap and configured with a substantially smooth finish on the exterior surface and having an interior recess;

a plurality of cylindrical permanent magnets stacked together and separated by at least one pole interface and received within the interior recess, each magnet having opposite north and south poles at generally planar ends, wherein the magnets are arranged so the north poles confront each other at the pole interfaces, whereby the resulting flux lines deflect outward from the pole interfaces with increased flux density relative to the flux density at regions distal to the pole interface; and whereby the quantities of magnetic contaminants in the circulating fluid that are attracted to and captured on the exterior surface proximate to the pole interfaces is greater than the contaminant quantities captured on the surface of the capture element in the regions between the pole interfaces.

2. The contaminant capture device according to claim 1, wherein the magnets are formed from a permanent magnet material having a curie temperature of approximately at least 310 degrees centigrade, a maximum flux of at least 10,000 Gauss, and a coercive force of at least 9,000 oersteds.

3. The contaminant capture device according to claim 1, wherein the magnets are formed from a neodymium, iron, boron alloy having an operating temperature of approximately at least 150 degrees centigrade.

4. The contaminant capture device according to claim 1, wherein the magnets are formed from a samarium cobalt alloy having an operating temperature of approximately at least 300 degrees centigrade.

5. The contaminant capture device according to claim 1, wherein the plurality includes at least 3 magnets each having a diameter of approximately 0.75 inches and a height of approximately 1 inch.

6. The contaminant capture device according to claim 1, wherein the plurality of the stacked magnets and the capture element are formed to protrude from a proximate end joined to the installation cap approximately at least 3 inches to an opposite distal end.

7. A contaminant capture device adapted to be immersed in a circulating fluid that is contained in an enclosed reservoir space that includes a wall formed with an opening, comprising:

an installation cap configured to be removably installed into the opening in the reservoir enclosure;

a non-magnetic high strength metallic, generally cylindrical capture element joined to the installation cap at a proximate end and configured with a substantially smooth finish on the exterior surface and having an interior recess;

a plurality of cylindrical permanent magnets stacked together and separated by pole interfaces and received within the interior recess, each magnet having opposite north and south poles at generally planar ends, wherein the magnets are arranged so the north poles confront each other at the pole interfaces, whereby the resulting flux lines deflect outward from the pole interfaces with increased flux density relative to the flux density at regions distal to the pole interface;

wherein each magnet of the plurality is selected to have different field strengths and wherein the magnets are stacked in order of increasing field strength from the proximate end to a distal end of the capture element; and whereby the quantities of magnetic contaminants in the circulating fluid that are attracted to and captured on the exterior surface proximate to the pole interfaces is greater than the contaminant quantities captured on the surface of the capture element in the regions between the pole interfaces.

8. The contaminant capture device according to claim 7, wherein the magnets are formed from a permanent magnet material having a curie temperature of approximately at least 310 degrees centigrade, a maximum flux of at least 10,000 Gauss, and a coercive force of at least 9,000 oersteds.

9. The contaminant capture device according to claim 7, wherein the magnets are formed from a neodymium, iron, boron alloy having an operating temperature of approximately at least 150 degrees centigrade.

10. The contaminant capture device according to claim 7, wherein the magnets are formed from a samarium cobalt alloy having an operating temperature of approximately at least 300 degrees centigrade.

11. The contaminant capture device according to claim 7, wherein the plurality includes at least 3 magnets each having a diameter of approximately 0.75 inches and a height of approximately 1 inches.

12. The contaminant capture device according to claim 7, wherein the plurality of the tacked magnets and the capture element are formed to protrude from the proximate end approximately at least 3 inches to the distal end.

13. A contaminant capture device for use in a circulating fluid bath that is contained in an enclosed reservoir space that includes a wall formed with an opening, comprising:

an installation cap configured to be removably installed into the opening;

a non-magnetic high strength metallic, generally cylindrical capture element joined to the installation cap and configured with a substantially smooth finish on the exterior surface and having an interior recess;

at least three cylindrical permanent magnets stacked together and separated by pole interfaces and received within the interior recess, each magnet having opposite north and south poles at generally planar ends, wherein the magnets are arranged so the north poles confront each other at the pole interfaces, whereby the resulting flux lines deflect outward from the pole interfaces with increased flux density relative to the flux density at regions distal to the pole interface; and wherein the quantities of magnetic contaminants in the circulating fluid that are attracted to and captured on the exterior surface proximate to the pole interfaces is greater than the contaminant quantities captured on the surface of the capture element in the regions between the pole interfaces.

14. The contaminant capture device according to claim 13, wherein the magnets are formed from a permanent magnet material having a curie temperature of approximately at least 310 degrees centigrade, a maximum flux of at least 10,000 Gauss, and a coercive force of at least 9,000 oersteds.

15. The contaminant capture device according to claim 13, wherein the magnets are formed from a neodymium, iron, boron alloy having an operating temperature of approximately at least 150 degrees centigrade.

16. The contaminant capture device according to claim 13, wherein the magnets are formed from a samarium cobalt alloy having an operating temperature of approximately at least 300 degrees centigrade.

17. The contaminant capture device according to claim 13, wherein the plurality includes at least 3 magnets each having a diameter of approximately 0.75 inches and a height of approximately 1 inches.

18. The contaminant capture device according to claim 13, wherein the plurality of the stacked magnets and the capture element are formed to protrude from a proximate end joined to the installation cap approximately at least 3 inches to an opposite distal end.

19. A contaminant capture device for use in a circulating fluid bath that is contained in an enclosed reservoir space that includes a wall formed with an opening, comprising:

an installation cap configured to be removably installed into the opening;

a non-magnetic high strength metallic, generally cylindrical capture element joined at a proximate end to the installation cap and configured with a substantially smooth finish on the exterior surface, a distal end, and having an interior recess between the ends;

a plurality of cylindrical permanent magnets stacked together and separated by at least one pole interface and received within the interior recess, each magnet having opposite north and south poles at generally planar ends, wherein the magnets are arranged with the north and south poles confronting each other at the pole interfaces, whereby the density of the flux lines emanating from the distal end are greater than those spanning the distal and proximate ends;

wherein the magnets of the plurality are each configured with different field strengths and are arranged in order of increasing field strength from the proximate end to the distal end; and wherein the quantities of magnetic contaminants in the circulating fluid that are attracted to and captured on the exterior surface proximate to the distal end is greater than the contaminant quantities captured on the surface of the capture element in the region between the distal and proximate ends.

20. The contaminant capture device according to claim 19, wherein the magnets are formed from a permanent magnet material having a curie temperature of approximately at least 310 degrees centigrade, a maximum flux of at least 10,000 Gauss, and a coercive force of at least 9,000 oersteds.

21. The contaminant capture device according to claim 19, wherein the magnets are formed from a neodymium, iron, boron alloy having an operating temperature of approximately at least 150 degrees centigrade.

22. The contaminant capture device according to claim 19, wherein the magnets are formed from a samarium cobalt alloy having an operating temperature of approximately at least 300 degrees centigrade.

23. The contaminant capture device according to claim 19, wherein the plurality includes at least 3 magnets each having a diameter of approximately 0.75 inches and a height of approximately 1 inches.

24. The contaminant capture device according to claim 19, wherein the plurality of the stacked magnets and the capture element are formed to protrude from the proximate end approximately at least 3 inches to the distal end.

25. A method using a capture device for removing contaminants from a circulating fluid that is contained in a machine that has an enclosed reservoir space that includes a wall formed with an opening, comprising the steps of:

selecting a capture device adapted to be immersed in the fluid that includes an installation cap configured to be removably installed into the opening in the reservoir enclosure, a non-magnetic high strength metallic, generally cylindrical capture element joined to the installation cap and configured with a substantially smooth finish on the exterior surface and having an interior recess, a plurality of cylindrical permanent magnets stacked together and separated by at least one pole interface and received within the interior recess, each magnet having opposite north and south poles at generally planar ends, wherein the magnets are arranged so the north poles confront each other at the pole interfaces, whereby the resulting flux lines deflect outward from the pole interfaces with increased flux density relative to the flux density at regions distal to the pole interface, and whereby the quantities of magnetic contaminants in the circulating fluid that are attracted to and captured on the exterior surface proximate to the pole interfaces is greater than the contaminant quantities captured on the surface of the capture element in the regions between the pole interfaces;

installing the capture device into the opening to protrude into the reservoir space for a period of time that includes operation of the machine whereby the circulating fluid passes proximate to the capture device; and removing the capture device from the opening during a period of non-operation of the machine for purposes of cleaning the captured contaminants therefrom.

* * * * *